US008600955B2

(12) United States Patent
Werner (10) Patent No.: US 8,600,955 B2
(45) Date of Patent: Dec. 3, 2013

(54) METHOD AND APPARATUS FOR MONITORING AN IN-MEMORY COMPUTER SYSTEM

(75) Inventor: Marc-Philip Werner, Walldorf (DE)

(73) Assignee: SAP AG, Walldorf (DE)

( * ) Notice: Subject to any disclaimer, the term of this patent is extended or adjusted under 35 U.S.C. 154(b) by 282 days.

(21) Appl. No.: 13/088,921

(22) Filed: Apr. 18, 2011

(65) Prior Publication Data

US 2012/0265725 A1 Oct. 18, 2012

(51) Int. Cl.
*G06F 7/00* (2006.01)
*G06F 17/00* (2006.01)
*G06F 17/30* (2006.01)

(52) U.S. Cl.
USPC .......................................... 707/688; 707/720

(58) Field of Classification Search
USPC .......................... 707/600, 607, 688, 719–720
See application file for complete search history.

(56) References Cited

U.S. PATENT DOCUMENTS

| | | | |
|---|---|---|---|
| 8,095,512 B2 * | 1/2012 | Barsness et al. | 707/652 |
| 8,170,981 B1 * | 5/2012 | Tewksbary | 707/600 |
| 8,375,047 B2 * | 2/2013 | Narayanan et al. | 707/764 |
| 2007/0250538 A1 * | 10/2007 | Moore | 707/104.1 |
| 2009/0083276 A1 * | 3/2009 | Barsness et al. | 707/10 |
| 2009/0164443 A1 * | 6/2009 | Ramos et al. | 707/5 |
| 2011/0246281 A1 * | 10/2011 | Satyavolu et al. | 705/14.25 |
| 2012/0084274 A1 * | 4/2012 | Renkes et al. | 707/703 |
| 2012/0084278 A1 * | 4/2012 | Franke et al. | 707/719 |
| 2012/0311295 A1 * | 12/2012 | Gaur et al. | 711/173 |

FOREIGN PATENT DOCUMENTS

EP 2040180 A1 * 3/2009

OTHER PUBLICATIONS

Hasso Plattner, A Common Database Approach for OLTP and OLAP using an In-Memor Column Database, SIGMOD'09, Jul. 2, 2009.*
Krueger et al., Data Structures for Mixed Workloads in In-Memory Databases, 2010 5th International Conference on Computer Sciences and Convergence Information, Dec. 2010.*

* cited by examiner

*Primary Examiner* — Jeffrey A Burke
(74) *Attorney, Agent, or Firm* — Fountainhead Law Group PC (57) ABSTRACT

An in-memory computing system for conducting on-line transaction processing and on-line analytical processing includes system tables in main memory to store runtime information. A statistics server can access the runtime information to collect monitoring data and generate historical data and other system performance metrics.

20 Claims, 7 Drawing Sheets

| # ( ) statisticsserver_targettable_HOST_RESOURCE_UTILIZATION_STATISTICS | |
|---|---|
| 501 — free_physical_memory | BIGINT |
| 502 — free_swap_space | BIGINT |
| 503 — host | VARCHAR (64) |
| 504 — total_cpu_idle_time | BIGINT |
| 505 — total_cpu_system_time | BIGINT |
| total_cpu_user_time | BIGINT |
| total_cpu_wio_time | BIGINT |
| used_physical_memory | BIGINT |
| used_swap_space | BIGINT |

| | |
|---|---|
| ▲ [ ] statisticsserver_monitor_SHM_USED_SIZE | |
| description | Check the shared memory size on the affected host |
| emailcondition | SHM_USED_SIZE > THRESHOLD_SHM_USED_SIZE_WARNING_LEVEL_3 |
| id | 12 |
| intervals | interval_1h |
| label | "Shared memory is used with " + SHM_USED_SIZE + " %" |
| name | Check shared memory used size |
| scope | host |
| useraction | Increase shared memory size See SAP Note 991567 |
| warning2 | SHM_USED_SIZE > THRESHOLD_SHM_USED_SIZE_WARNING_LEVEL_2 |
| warning3 | SHM_USED_SIZE > THRESHOLD_SHM_USED_SIZE_WARNING_LEVEL_3 |
| ▷ [ ] statisticsserver_monitor_SUMMARY_EMAIL_ALL | |

Fig. 7

METHOD AND APPARATUS FOR MONITORING AN IN-MEMORY COMPUTER SYSTEM

BACKGROUND

The present invention relates generally to computer systems and in particular to in-system monitoring of multiprocessor computer systems.

Unless otherwise indicated herein, the approaches described in this section are not prior art to the claims in this application and are not admitted to be prior art by inclusion in this section.

A typical business enterprise comprises a large number of organizations (marketing, engineering, production, supply, sales, customer service, and so on). Large volumes of data are typically generated and collected by these many organizations.

Business intelligence (BI) and business warehousing (BW) tools conventionally are built on a database architecture where the data is collected and stored onto disk storage systems and subsequently read from disks (e.g., hard disk drive units) comprising the disk storage system for analysis. Conventional architectures also separate the function of transaction processing and analytical processing.

On-line transaction processing (OLTP) is typically characterized by a large number of short on-line transactions (INSERT, UPDATE, DELETE). OLTP systems in an enterprise are the source of data for the rest of the enterprise. Various organizations in an enterprise typically connect to an OLTP to record their activities. For example, a manufacturing group may connect to an OLTP system to input data into a manufacturing database such as incoming parts, production units, tracking of defects, and so on. A sales department may connect to an OLTP system to input data to a sales database.

On-line analytical processing (OLAP), by comparison, constitute a user of the data collected and stored in OLTP systems. Whereas OLTP may be viewed as a collector of raw data, OLAP may be viewed as a user of the raw data. OLAP queries are often complex and involve aggregations of the data stored in one or more OLTP databases. An OLAP database typically stores aggregated, historical data. OLAP is typically characterized by a lower volume of transactions as compared to OLTP.

There is always huge demand for real-time reporting that can leverage real-time data and provide improved decision making capability by reporting from transactional and operational systems. The success of a business may depend on how quick a reliable and smart decision can be made based on information available at that moment. Real-time computing systems have been evolving to meet these needs. One such system is based on an architecture known as in-memory computing.

In-memory computing can parse and analyze data in a matter of minutes to seconds as compared to conventional computing architectures which may require days to weeks. In-computing architectures are highly integrated systems. Maintaining and otherwise supporting such systems require equally fast response times to detect and assess changes in the system that may degrade performance.

These and other issues are addressed by embodiments of the invention, individually and collectively.

SUMMARY

A method and apparatus for monitoring an in-memory computing system includes performing on-line transaction processing and on-line analytical processing in the in-memory computer system. Results of the processing are stored in a main memory component of the in-memory computer system. Runtime information relating to the on-line transaction processing and on-line analytical processing can be stored in system tables in the main memory. Information from the system tables can be retrieved as monitoring data, and system performance metrics can be produced based on the monitoring data.

In embodiments, the runtime information may include data relating to events arising during the on-line transaction processing and on-line analytical processing. The runtime information may include state information relating to operational states of execution of the on-line transaction processing and on-line analytical processing. The runtime information may include system state information relating to the components of the in-memory computer system.

In embodiments, a business intelligence tool can make one or more requests for some of the system performance metrics. Notifications can be sent based on one or more predetermined data analyses performed on the monitoring data.

The following detailed description and accompanying drawings provide a better understanding of the nature and advantages of the present invention.

BRIEF DESCRIPTION OF THE DRAWINGS

FIG. 5A shows an instantiation of the data table defined in FIG. 5.

DETAILED DESCRIPTION

Described herein are embodiments for in-system monitoring of in-memory computing architectures. In the following descriptions, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1:
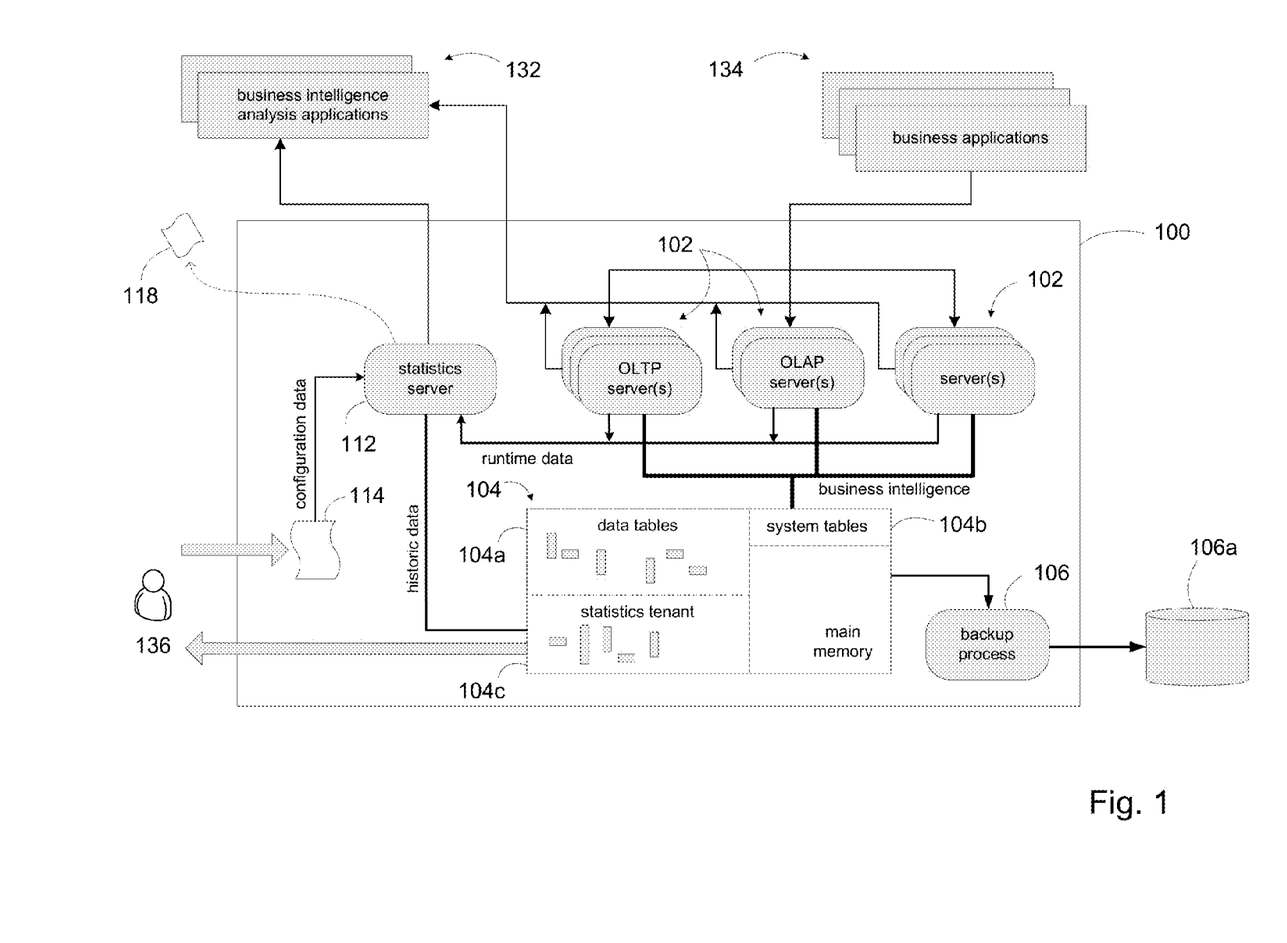
FIG. 1 is a block diagram of an in-memory computing system in accordance with the present invention.

With reference to FIG. 1, in embodiments of the present invention an in-memory computing system 100 for an organization can be interfaced with various business tools of that organization. One class of business tools is business applications 134 used by the various operating groups comprising the organization. Business applications 134 can communicate with the in-memory computing system 100 to serve as a repository for the data generated by those operating groups. Typical business applications that the operating groups execute include applications such as PLM (product lifecycle management), CRM (customer relationship management), PPS (product production system), ERP (enterprise resource planning), and so on. These applications typically generate data (referred to as "transaction data") that can be stored in the in-memory computing system. For example, transaction data may be information relating to the sale of widgets such as where the sale occurred, when the sale took place, the sale price, and so on. Transaction data may be information about the production of widgets such as how many widgets were produced at a given manufacturing site, information about the raw materials used to make the widgets and so on.

Another class of business tools is business intelligence (BI) analysis applications 132 (also referred to a BI tools). This class of business tools typically provides historical, current, and predictive views of business operations. BI analysis applications 132 play an important role in the strategic planning process of the organization. These applications treat the collected and analyzed data as business intelligence in the areas of customer profiling, customer support, market research, market segmentation, product profitability, statistical analysis, and inventory and distribution analysis, production and manufacturing tracking, and so on in order to aid in the decision making process. Common functions include reporting, online analytical processing, analytics, data mining, business performance management, benchmarking, text mining and predictive analytics, and so on. BI analysis applications 132 can communicate with the in-memory computing system 100 to access the data provided by the business applications 134 and data generated from analyses conducted on the "raw" data provided by the business applications.

Figure 2:
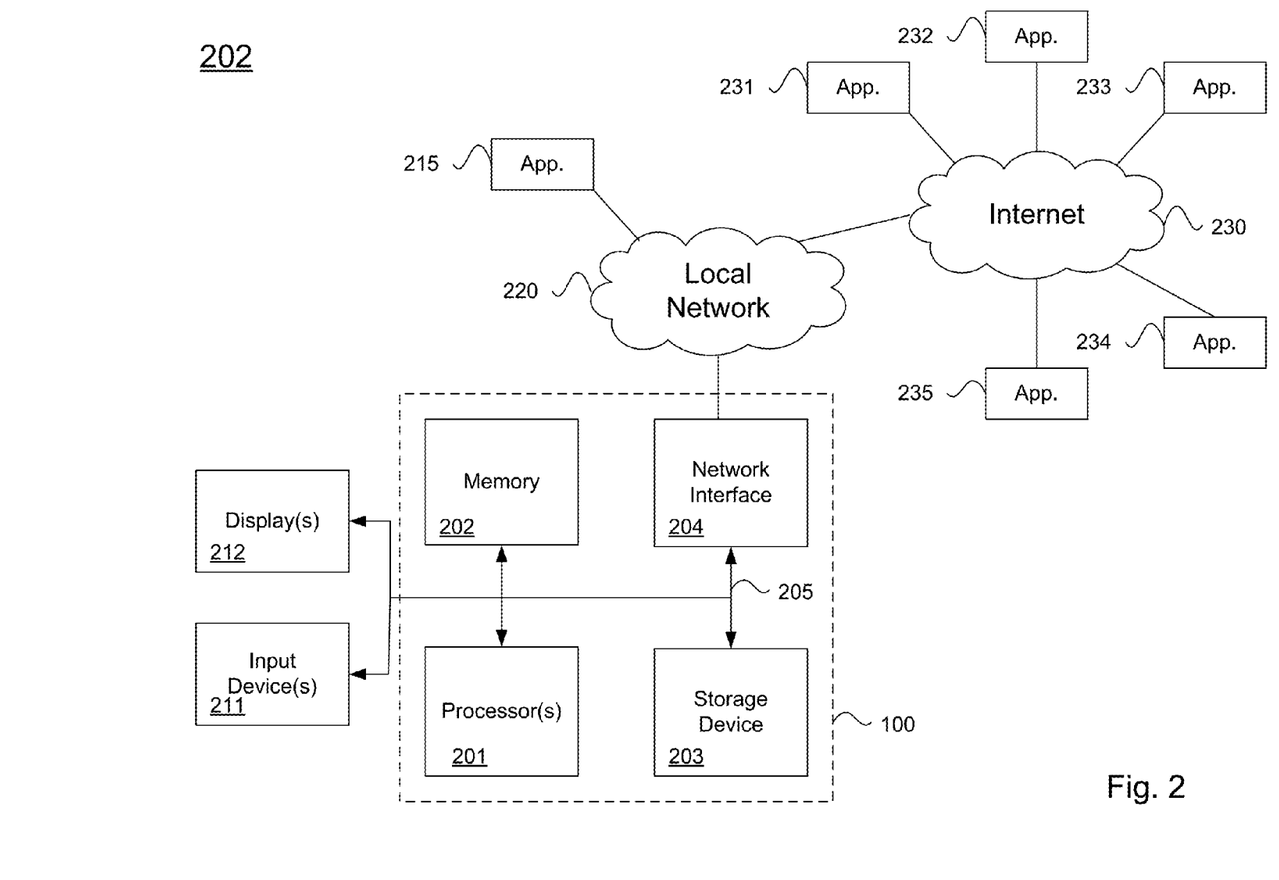
FIG. 2 represents a high level system diagram of an in-memory computing system in accordance with the present invention.

Referring to FIG. 2 for a moment, a system level block diagram illustrates a typical arrangement of embodiments of the present invention. Applications 215 and 231-235 represent instantiations of the business tool 132, 134. The applications 215 and 231-235 may communicate with the in-memory computing system 100 in any of a number of ways. A common configuration is IP (internet protocol) based communication. For example, applications 215 may operate locally within a local area network 220. The in-memory computing system 100 may be locally connected on the local area network 220. Other applications 231-235 may be located outside of the local network can communicate with the in-memory computing system 100 over a suitable communication system such as the Internet 230.

In embodiments, the in-memory computing system 100 may include a data processor subsystem 201 comprising a plurality of data processing units. A main memory subsystem 202 may comprise various forms of read/write random access memory, including volatile memory such as DRAM and non-volatile memory such as FLASH memory, and so on. The main memory subsystem 202 may also include read-only type memory such as ROM memory. A distinction between main memory and disk-based memory is the former does not require disk seek operations (e.g., rotating a disk, moving a read/write head into position, etc.) and thus can access data significantly more quickly.

The in-memory computing system 100 is a computing architecture in which data is moved off disk storage and into main memory, thus avoiding the need (and delay) to run disk-seek operations each time a data look-up is performed. As can be appreciated, this approach significantly increases performance. For example, the tables comprising a database can be stored in main memory (e.g., RAM, flash memory, and the like) as opposed to disk storage such as hard disk drives, thus increasing data look-up performance.

To further improve data look-up speed, data tables in the in-computing system 100 can be stored in column-oriented fashion, rather than row-oriented. For example, a customer record might have name, store location, purchased item, and price as relevant fields (four fields). A table of such customer records might have the following data:

| name | store | item | price |
|------|-------|------|-------|
| John | S1 | shoes | 100 |
| Joe | S4 | book | 20 |
| Mary | S1 | pens | 10 |
| Sam | S2 | paper | 50 |
| Dale | S2 | shirts | 45 |

In a row-oriented storage scheme, the data comprising the table would be stored in continuous locations in main memory or on disk in the following sequence:

John S1 shoes 100 Joe S4 book 20 Mary S1 pens 10 Sam S2 paper 50 Dale S2 shirts 45

In a column-oriented storage scheme, the data would be stored in the following sequence:

John Joe Mary Sam Dale S1 S4 S1 S2 S2 shoes book pens paper shirts 100 20 10 50 45

Where analytical processing that requires the computation of aggregate calculations constitutes a major component of the workload in the in-computing system 100, column-oriented storage would be advantageous because it is more efficient to perform aggregate operations on data (e.g. summing of data) when the data is stored in sequential memory locations.

The in-memory computing system 100 may nonetheless include a storage subsystem 203 comprising one or more mass storage devices such as hard disk drives and the like, to store the operating system, administrative information (e.g., login accounts), and the like. A network interface subsystem 204 can access to the in-memory computer system 100, for example over a telecommunication network. A system of buses 205 can interconnect the foregoing subsystems, providing control lines, data lines, and/or voltage supply lines to/from the various subsystems. The in-memory computer system 100 may include a suitable display(s) 212 and input devices 211 such as a keyboard and a mouse input device.

Returning to FIG. 1, in embodiments, the in-memory computer system 100 includes various processes 102 (e.g., executed by the data processing units 201) in communication with the business tools 132, 134. For example, the business applications 134 may provide data collected during the daily operations of the organization that would be stored in the in-memory computing system. For example, a CRM business application may generate customer support data. A PPS business application may generate information about suppliers of parts, and so on.

Accordingly, one or more on-line transaction processing (OLTP) servers executing on the in-memory computing system 100 can communicate with the business applications 134 to receive data from those applications; e.g., customer purchases, manufacturing logs, telemarketing data, and so on. As explained above, the in-memory computing system 100 stores received data in main memory 104 rather than on disk storage devices in order to realize improvements in data access speed by avoiding data seek operations required of disk storage devices. Accordingly, the OLTP servers may store data received from business applications 134 into tables 104a that are memory resident (as opposed to disk resident).

On or more on-line analytical process (OLAP) servers can access the data stored in the data tables 104a to analyze the data in the data tables to provide insight into the organization's business and to facilitate planning of various operations such as manufacturing, marketing, customer support and so on. The OLAP servers may receive data directly from the business applications 134 as well as accessing the data tables 104a in order to conduct its analyses. Results produced by the one or more OLAP process serves may include reports, new data tables for data mining, and so on. Such results can be stored back into main memory 104 for subsequent access and further analysis. Storing the results back into main memory 104 allows for quick access to the results without the delays of disk storage devices.

Additional servers may be provided in the in-memory computing system 100, for example, to support the operations of the OLTP servers and the OLAP servers.

Though the collected and analyzed data may be stored in main memory 104 for performance reasons, the in-memory computing system 100 may nonetheless include a suitable backup or remote storage system in order to provide permanent storage of the data. For example, a backup process 106 may execute in the in-memory computing system 100 to read out data stored in main memory 104 to be stored in a backup storage system 106a. The backup storage system 106a may be co-located with the in-memory computing system 100, or may be remotely located (e.g., in a different geographic location).

The business intelligence analysis applications 132 can communication with the OLTP servers and with the OLAP servers to access the "raw" data produced by the business applications 134 and collected by the OLTP servers, and to access analyzed results produced by the OLAP servers in order to provide planners in the organization with information for making decisions. For example, business intelligence analysis applications 132 include a wide range of tool such as financial analysis, statistical process control, and so on. Business intelligence analysis applications 132 may be used to spot trends, identify patterns, interpret outliers, uncover unexpected relationships within the raw data collected by the OLTP servers, and the like. Business intelligence analysis applications 132 may collect results from or otherwise interact with OLAP servers to create reports such as sales forecasts, manufacturing requirements, and so on.

In embodiments, the in-memory computing system 100 may include a statistics server process 112 executed by the data processor subsystem 201 (FIG. 2). The statistics server 112 can communicate with the other servers 102, for example, via a suitable inter-process communication protocol. The statistics server 112 can collect runtime information as monitoring data from processes 102 executing in the in-memory computing system 100. In embodiments, runtime information can be collected from the operating system (OS) as well.

Runtime information may include state information about the state of a process 102. Run time information may include state information about the in-memory computing system 100 itself. For example, state information may include system information relating to the components of the in-memory computing system 100 such as memory usage information, processor load data, information about other processes that are executing, users who might be logged on, information about the performance of the data processing unit of the data processing subsystem 201, memory access speed data, IP packet traffic, and so on. Such information may be collected by a system monitoring process having sufficient access (e.g., supervisory access) to the operating system (OS) tables and other OS level data.

State information may include process-specific information for each process 102. State information may include a process start time (if the process is a scheduled process), total run time, number memory accesses, memory allocations made by the process, and so on. Runtime information can be generated by a process 102 to indicate the occurrence of events that might occur during execution of the process. For example, runtime information may include exception codes that a process 102 might generate as a result of encountering an error in the data (e.g., unexpected data format, illegal data value, etc.). An exception code may be generated by a process 102 if an error is detected with a data table that the process is accessing. An exception code may be generated if a process 102 did not have sufficient time to complete a task, and so on. Process-specific information may include data about how much data is collected by the process 102, how much data is generated by the process, etc. Such information can be collected by sub-routines within the process 102, or by process threads created (e.g., spawned, forked) by the process.

In embodiments, the runtime information can be stored in system tables 104b in the main memory 104 corresponding to each process 102. Some system tables 104b may be shared by two or more processes. In embodiments, the statistics server 112 can collect the runtime information by interrogating each process 102. The process 102 can then access the appropriate system table(s) 104b and provide the statistics server 112 with suitable responses. In embodiments, the statistics server 112 can collect the information from the system tables 104b. In an embodiment, the system tables 104b can be in the form of database tables. For example, the system tables 104b can be relational database tables accessed using an SQL query language.

The statistics server 112 can accumulate the collected data as historic data in a statistics tenant 104c in main memory 104 for a posteriori analysis. The statistics server 112 can perform analyses on the collected data to generate system performance metrics. For example, the statistics server 112 can produce a history of memory usage. Examples of performance metrics can include a history of processing times of the processes 102, responses to user requests, and so on.

Figure 3:
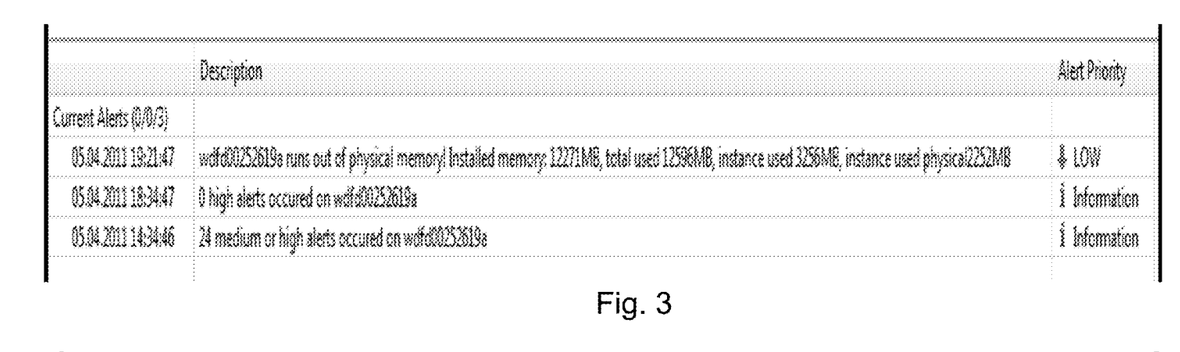
FIG. 3 illustrates an example of an alert in accordance with an embodiment.

A suitable user interface can be provided to allow a user 136 to query the historic data contained in the statistics tenant 104c. In embodiments, the user 136 can be notified with alerts to indicate the occurrence of events. For example, FIG. 3 illustrates a portion of a display of an alert that can be presented on a suitable display device.

Figure 4:
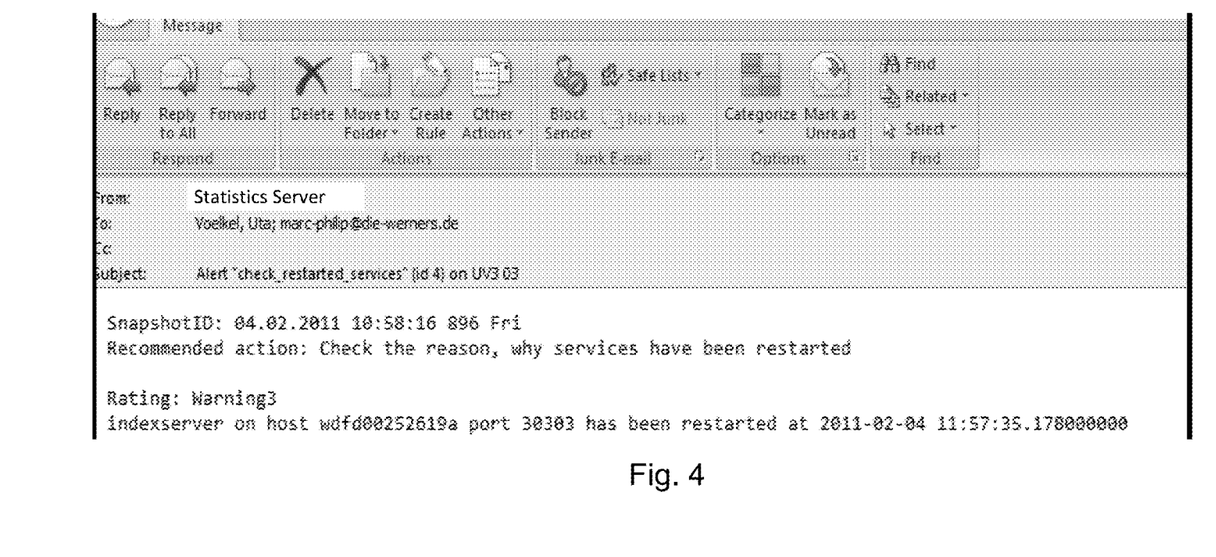
FIG. 4 illustrates an example of an alert that can be communicated.

In embodiments, the statistics server 112 can notify the user 136 of certain alerts 118, for example, if immediate action is required. Any suitable notification can serve as an alert 118. For example, referring to FIG. 4, the statistics server 112 can generate an email message that includes relevant information about the situation. Alert triggers can be specified by the user 136 to control when an alert 118 is communicated to the user. For example, available memory falling below 20% can be a criterion for sending an alert 118.

In embodiments, an external application can interface with the statistics server 112 to gather the historic data that has been collected by the statistics servers to conduct a more detailed analysis. For example, business intelligence analysis applications 132 are typically designed to analyze business data collected by the organization's various operations and make or facilitate strategic business decision-making activities. Accordingly, the same business intelligence analysis applications 132 may be adapted to identify underlying trends in the historic data and/or perform additional analyses on the historical and performance data to steer technical decisions regarding the performance of the in-computing system 100.

Consider a simple example: Suppose an organization has offices in Berlin and in California. Suppose a user in the Berlin office has scheduled a backup to take place each day at 00:30 AM. The statistics server 112 may collect information about the occurrence of backup processing happening each day at 00:30 AM (Berlin time). Suppose the statistics server 112 also collects data indicating slow response times of a process taking place in the California office at around 10 AM. These two apparently independent observations can be analyzed by a business intelligence analysis application 132. The business intelligence application 132 may consider the time difference between Berlin and California—Berlin is ahead of California by 9 or 10 hours, depending on the time of year, and identify a correlation between backups taking place in Berlin and when the process in California is being performed. The business intelligence application 132 may then conclude that the observed slow response times in California are due to the backup process taking place at around the same time in Berlin. This result can be used by a system administrator to reschedule the backup activity in Berlin or the activity in California, or the administrator may consider upgrading the hardware (e.g., additional processors, memory, and so on).

The statistics server 112 may include a configuration file 114 to configure the activities of the statistics server. Configuration information can be input by the user 136 and stored in the configuration file 114. In embodiments, the configuration information can specify many aspects of the collection of performance data; the collection is highly configurable. The configuration information can specify what data to monitor and collect. The configuration information can specify a collection schedule for the statistics server 112. Since collection activities of the statistics server 112 draw on system resources of the in-memory computing system 100 (e.g., processor bandwidth, memory bandwidth), it may be desirable to schedule when the statistics server operates, for how long the statistics server operates, and how frequent the collections are performed. The configuration information can specify the format (e.g., data table schema) of output data generated by the statistics server 112. Being able to specify the output format can facilitate interfacing the output data with analytical tools (e.g., business intelligence analysis applications 132). The configuration information can include triggering information to specify the conditions for when an alert 118 is communicated to a user. More generally, the configuration information can specify performing actions in addition to or instead of sending alerts 118. The configuration information can specify rules for assessing the historic data collected by the statistics server 112. The configuration information can specify/define conditions and events, and the actions that should be taken when those conditions are met or when those events occur.

Figure 5:
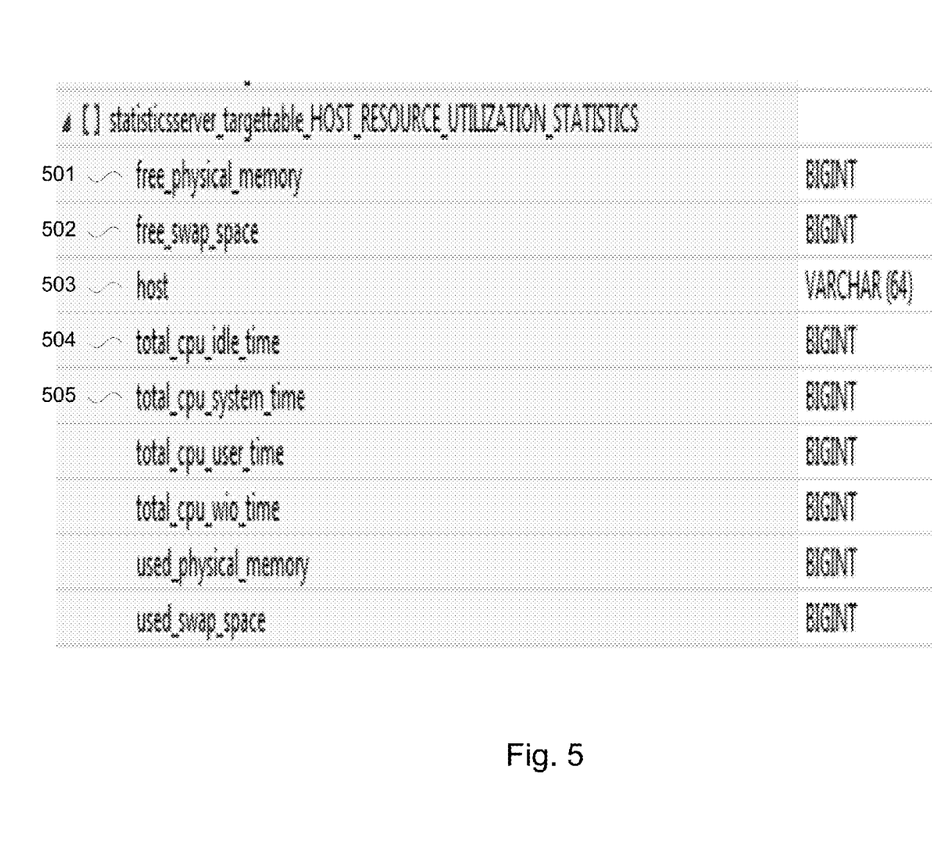
FIG. 5 shows an example of a data table definition in accordance with an embodiment.

FIG. 5 shows an illustrative example of a data table definition for a data table that can be stored in the statistics tenant 104c in accordance with an embodiment and filled in by the statistics server 112. In the particular example shown, the data table definition specifies a table to store utilization statistics for a host CPU. The data table definition specifies various data fields and their data types. FIG. 5A shows an example of an instantiation of a data table 500 defined by the data table definition shown in FIG. 5. Columns 501-505 are illustrated. Next will be a discussion of how the columns of the data table can be populated.

Figure 6:
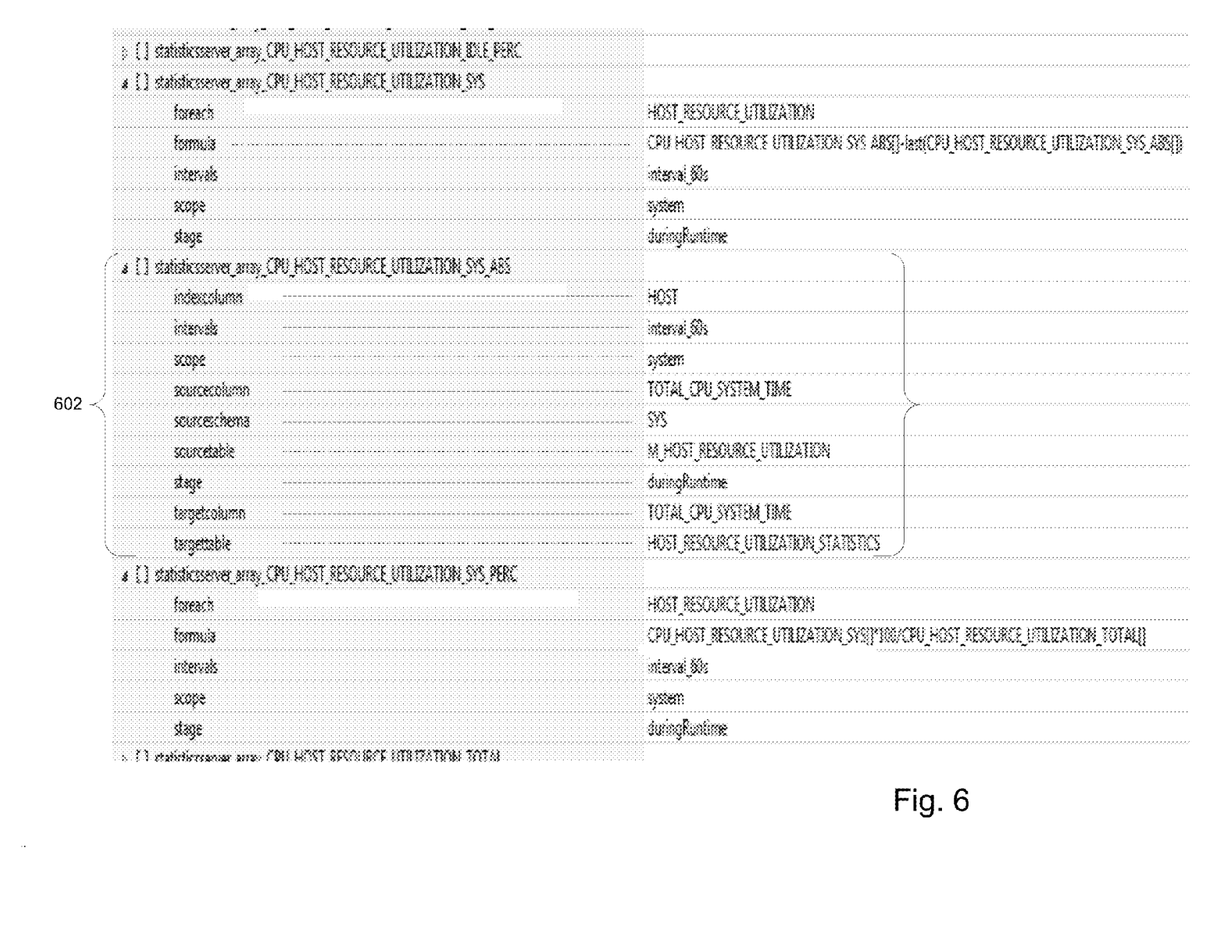
FIG. 6 is an example of an array definition in accordance with an embodiment.

Each of the columns 501-505 in the data table 500 is associated with an array definition. FIG. 6 shows an example of an array definition 602 that specifies how column 505 (target column) is populated. The array definition 602 includes an "indexcolumn" key which specifies which column in the data table 500 to index on. In the example, the index is on the HOST column 503. The "sourceschema", "sourcetable", and "sourcecolumn" keys in the array definition 602 identify which of the system tables 104b will serves as the source of data to populate the target column 505 in. In the example shown in FIG. 6, data from the system table SYS.M_HOST_RESOURCE_UTILIZATION is accessed, and in particular the data is contained in the column called TOTAL_CPU_SYSTEM_TIME. The array definition 602 further specifies that the target column 503 is updated every 60 seconds (see "intervals"). In this way, a history can be constructed.

Figure 7:
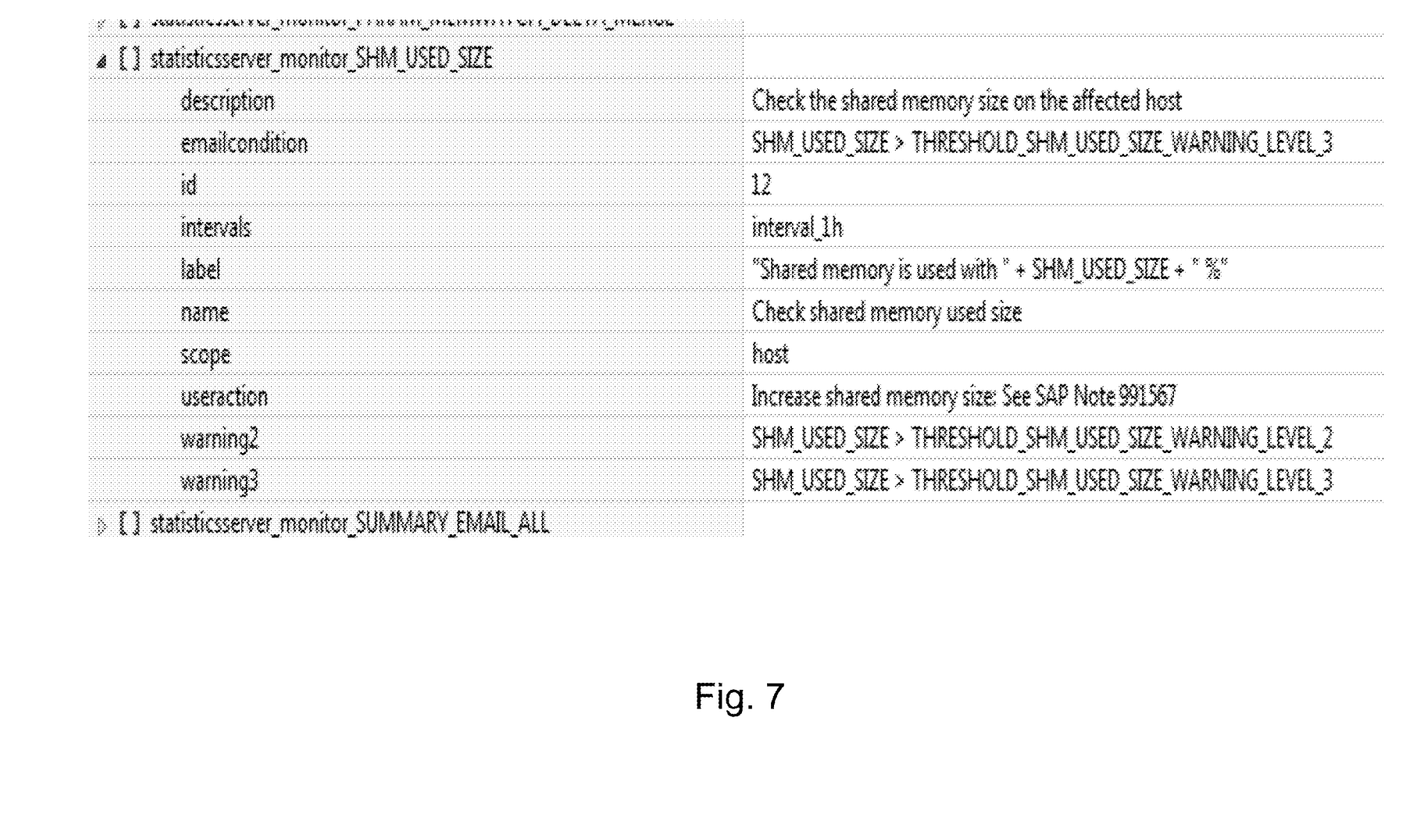
FIG. 7 is an example of an array definition for alerts.

Array definitions need not be used for populating columns in a target data table. For example, the array definition shown in FIG. 7 can be used to specify a trigger for an alarm. In embodiments, array definitions can include arithmetic and logic formulas. The illustrative array definition shown in FIG. 7 defines the criteria for an email alert. There is a "label" key which specifies the message to be included in the email. The array definition includes variables such as SHM_USED_SIZE and THRESHOLD_SHM_USED_SIZE_WARING_LEVEL_3 which are replaced at runtime by corresponding actual values when the message is incorporated in the body of an email. In this way, the email text is dynamic and can be configured with the specific conditions of the system that the email is intended to convey. An "emailcondition" key specifies an arithmetic expression as the criterion for sending the email alert. The value of the "name" key is sent in the email's subject field (it is just plain text). The value of the "description" key can be used in a suitable graphical user interface (GUI) to explain the meaning of the alert to the user. In embodiments, formulas can incorporate other array definitions; e.g., the "warning2" and "warning3" keys are specified using arithmetic expression that reference array definitions.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A method for monitoring system performance of an in-memory computer system comprising operating one or more data processing units to perform steps of:
   conducting a plurality of on-line transaction processes (OLTPs) to receive and store data in a main memory component of the in-memory computer system;
   conducting a plurality of on-line analytical processes (OLAPs) on the data stored in the memory component to produce a plurality of data analysis results;
   storing the data analysis results in the main memory component;
   storing runtime information in a plurality of system tables in the main memory component relating to the step of conducting the plurality of OLTPs and the step of conducting the plurality of OLAPs, wherein the runtime data comprises process-specific information about the state of the plurality of OLTPs and the plurality of OLAPs;
   retrieving as monitoring data some of the information stored in the system tables; and
   performing one or more predetermined data analyses on the monitoring data to produce a plurality of system performance metrics, wherein at least one of the one or more predetermined data analyses comprise predictive analysis.

2. The method of claim 1 wherein the runtime information includes data relating to events arising during the step of conducting the plurality of OLTPs and the step of conducting the plurality of OLAPs.

3. The method of claim 1 wherein the runtime information includes state information relating to operational states of execution of the plurality of OLTPs and the plurality of OLAPs.

4. The method of claim 1 wherein the runtime information includes system state information.

5. The method of claim 1 further comprising operating the one or more data processing units to receive from a business intelligence tool one or more requests for some of the system performance metrics.

6. The method of claim 1 further comprising operating the one or more data processing units to perform a step of sending a notification based on results of the one or more predetermined data analyses performed on the monitoring data.

7. The method of claim 1 wherein the main memory component comprises one or more of random access memory (RAM) or flash memory.

8. The method of claim 1 wherein the system tables are organized as one or more relational databases, wherein the step of retrieving comprises generating one or more SQL queries.

9. The method of claim 1 further comprising operating the one or more data processing units to perform a step of receiving input from a user comprising information indicative of the one or more predetermined data analyses.

10. An in-memory computing system having performance monitoring comprising:
    a plurality of server subsystems;
    a main memory subsystem in data communication with the plurality of server subsystems and having stored thereon one or more system tables;
    a disk storage subsystem; and
    computer executable instructions stored among the main memory subsystem and the disk storage subsystem,
    wherein the computer executable instructions are configured to cause the server subsystems to:
    execute a plurality of on-line transaction processes (OLTPs) to receive and store data in a memory component of the in-memory computer system;
    execute a plurality of on-line analytical processes (OLAPs) on the data stored in the memory component to produce a plurality of data analysis results;
    store the data analysis results in the main memory subsystem;
    store runtime information in a plurality of system tables in the main memory subsystem relating to the step of conducting the plurality of OLTPs and the step of conducting the plurality of OLAPs, wherein the runtime data comprises process-specific information about the state of the plurality of OLTPs and the plurality of OLAPs;
    retrieve as monitoring data some of the information stored in the system tables; and
    perform one or more predetermined data analyses on the monitoring data to produce a plurality of system performance metrics, wherein at least one of the one or more predetermined data analyses comprise predictive analysis.

11. The system of claim 10 wherein the main memory subsystem comprises one or more of random access memory (RAM) or flash memory.

12. The system of claim 10 wherein the runtime information includes state information relating to operational states of execution of the plurality of OLTPs and the plurality of OLAPs.

13. The system of claim 10 wherein the computer executable instructions are further configured to cause the server subsystems to receive from a business intelligence tool one or more requests for some of the system performance metrics.

14. The system of claim 10 wherein the computer executable instructions are further configured to cause the server subsystems to send a notification based on results of the one or more predetermined data analyses performed on the monitoring data.

15. A non-transient computer readable medium having stored thereon computer executable instructions configured to cause one or more data processing units to perform steps of:
    conducting a plurality of on-line transaction processes (OLTPs) to receive and store data in a main memory of the in-memory computer system;
    conducting a plurality of on-line analytical processes (OLAPs) on the data stored in the memory component to produce a plurality of data analysis results;
    storing the data analysis results in the main memory;
    storing runtime information in a plurality of system tables in the main memory relating to the step of conducting the plurality of OLTPs and the step of conducting the plurality of OLAPs, wherein the runtime data comprises process-specific information about the state of the plurality of OLTPs and the plurality of OLAPs;
    retrieving as monitoring data some of the information stored in the system tables; and
    performing one or more predetermined data analyses on the monitoring data to produce a plurality of system performance metrics, wherein at least one of the one or more predetermined data analyses comprise predictive analysis.

16. The computer readable medium of claim 15 wherein the runtime information includes data relating to events arising during the step of conducting the plurality of OLTPs and the step of conducting the plurality of OLAPs.

17. The computer readable medium of claim 15 wherein the runtime information includes state information relating to operational states of execution of the plurality of OLTPs and the plurality of OLAPs.

18. The computer readable medium of claim 15 wherein the computer executable instructions are further configured to cause the one or more data processing units to receive from a business intelligence tool one or more requests for some of the system performance metrics.

19. The computer readable medium of claim 15 wherein the computer executable instructions are further configured to cause the one or more data processing units to perform a step of sending a notification based on results of the one or more predetermined data analyses performed on the monitoring data.

20. The computer readable medium of claim 15 wherein the system tables are organized as one or more relational databases, wherein the step of retrieving comprises generating one or more SQL queries.

* * * * *